United States Patent
Kadowaki (10) Patent No.: US 7,859,734 B2
(45) Date of Patent: Dec. 28, 2010

(54) LIGHT SCANNING DEVICE AND IMAGE FORMING APPARATUS

(75) Inventor: Seijiro Kadowaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 461 days.

(21) Appl. No.: 12/109,802

(22) Filed: Apr. 25, 2008

(65) Prior Publication Data

US 2008/0266631 A1    Oct. 30, 2008

(30) Foreign Application Priority Data

Apr. 26, 2007  (JP) .............................. 2007-117089

(51) Int. Cl.
*G02B 26/08* (2006.01)
(52) U.S. Cl. .................................. 359/213.1
(58) Field of Classification Search ............. 359/212.1, 359/202.1, 213.1, 214.1
See application file for complete search history.

(56) References Cited

U.S. PATENT DOCUMENTS

| 5,446,556 A | 8/1995 | Kuroiwa et al. |
| 5,668,644 A | 9/1997 | Kuroiwa et al. |
| 6,937,372 B2 | 8/2005 | Kandori et al. |
| 7,262,894 B2 * | 8/2007 | Oettinger et al. ......... 359/213.1 |

FOREIGN PATENT DOCUMENTS

| JP | 05-127109 | 5/1993 |
| JP | 2003-131151 | 5/2003 |
| JP | 2007-185786 | 7/2007 |

OTHER PUBLICATIONS

Office Action received for JP2007-117089 with a mailing date of Dec. 16, 2008.

* cited by examiner

*Primary Examiner*—Euncha P Cherry
(74) *Attorney, Agent, or Firm*—Banner & Witcoff, Ltd.

(57) ABSTRACT

A light scanning device includes: a light source which emits a light beam; an oscillating mirror which oscillates rotationally to reflect the light beam; an optical system which is configured to convert the light beam reflected by the oscillating mirror to be scanned over a scanning line on a target at a constant speed when an oscillation amplitude of the light beam by the oscillating mirror is a reference value; a detection unit which detects the light beam at least one position; a modulation controller which controls modulation of the light beam based on external data; and a timing correction unit which corrects a modulation timing based on two consecutive detection times of the light beam detected by the detection unit and detection times of the light beam detected by the detection unit when the oscillation amplitude is the reference value.

16 Claims, 6 Drawing Sheets

LIGHT SCANNING DEVICE AND IMAGE FORMING APPARATUS

CROSS-REFERENCE TO RELATED APPLICATION

This application claims priority from Japanese Patent Application No. 2007-117089, filed on Apr. 26, 2007, the entire subject matter of which is incorporated herein by reference.

TECHNICAL FIELD

Aspects of the present invention relate to a light scanning device and an image forming apparatus, and more particularly to a light scanning device with using an oscillating mirror which oscillates rotationally, and an image forming apparatus which electro-photographically forms an image using the light scanning device.

BACKGROUND

In recent years, a light scanning device for making scanning with using an oscillating mirror which oscillates rotationally in reciprocating manner by a sinusoidally oscillating element such as a galvanometer has been proposed, instead of a light scanning device for making scanning by deflecting a light beam with a polygon mirror which rotates at a constant speed. In such light scanning device, the oscillating mirror is driven at a resonance frequency of the oscillating mirror in order to increase the oscillation amplitude. Although a size of the light scanning device can be reduced with using such oscillating mirror, the resonance frequency of the oscillating mirror changes due to temperature variations, so that the oscillation amplitude or phase of the oscillating mirror may be deviated from the reference value in some cases. Thus, a detection unit such as a BD sensor for detecting the light beam at least one point in the scanning range of the light beam is provided, and the irradiating start position and irradiating end position corresponding to the oscillation amplitude or phase at that time are calculated based on the detection timing of the light beam by the detection unit (e.g., refer to JP-A-2003-131151).

SUMMARY

However, in the light scanning device which is applied to the image forming apparatus of the electro-photographic type, an optical system including a lens (hereinafter referred to as an F arcsine θ lens), which has a relationship r=f·arcsin θ (f is a focal length of lens) between the incident angle θ and the image forming position r, is disposed between the oscillating mirror and the photoconductor. This is because an image forming apparatus is for a high pixel density and requires that the position of pixel on a scanning line is grasped accurately.

However, JP-A-2003-131151 involving a technique for the display device, describes only a method for calculating the irradiating start position and the irradiating end position, but does not describe a control during the start to the end. And the use of the optical system such as the F arcsine θ lens is not considered in JP-A-2003-131151. Therefore, the control described therein can not be directly applied to the light scanning device which is applied to the image forming apparatus.

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a light scanning device that is applicable to an image forming apparatus and can accurately arrange positions of pixels on a scanning line, and the image forming apparatus using the light scanning device.

According to an exemplary embodiment of the present invention, there is provided a light scanning device comprising: a light source which emits a light beam; an oscillating mirror which oscillates rotationally to reflect the light beam; an optical system which is disposed between the oscillating mirror and a target, and which is configured to convert the light beam reflected by the oscillating mirror to be scanned over a scanning line on the target at a constant speed when an oscillation amplitude of the light beam by the oscillating mirror is a reference value; a detection unit which detects the light beam at least one position within a scanning range of the light beam; a modulation controller which controls modulation of the light beam based on external data; and a timing correction unit which corrects a modulation timing by the modulation controller based on two consecutive detection times of the light beam detected by the detection unit and two consecutive detection times of the light beam detected by the detection unit when the oscillation amplitude of the light beam by the oscillating mirror is the reference value.

According to another exemplary embodiment of the present invention, there is provided an image forming apparatus comprising: a light scanning device; a photoconductor; a developing unit; and a transfer unit. The light scanning device comprises a light source which emits a light beam; an oscillating mirror which oscillates rotationally to reflect the light beam; an optical system which is disposed between the oscillating mirror and a target, and which is configured to convert the light beam reflected by the oscillating mirror to be scanned over a scanning line on the target at a constant speed when an oscillation amplitude of the light beam by the oscillating mirror is a reference value; a detection unit which detects the light beam at least one position within a scanning range of the light beam; a modulation controller which controls modulation of the light beam based on print data; and a timing correction unit which corrects a modulation timing by the modulation controller based on two consecutive detection times of the light beam detected by the detection unit and two consecutive detection times of the light beam detected by the detection unit when the oscillation amplitude of the light beam by the oscillating mirror is the reference value. The photoconductor is disposed on the scanning line of the light scanning device as the target. And on the photoconductor, an electrostatic latent image is formed by applying the light beam. The developing unit develops the electrostatic latent image formed on the photoconductor by depositing a developer. The transfer unit transfers the developer deposited by the developing unit onto a recording medium.

According to a further exemplary embodiment of the present invention, there is provided a light scanning device comprising: a light source which emits a light beam; a modulation controller which controls modulation of the light beam emitted from the light source according to external data; an oscillating mirror which oscillates rotationally to reflect the light beam; an optical system which is configured to convert the light beam reflected by the oscillating mirror to be scanned; a detection unit which detects the light beam passing through a detection position; and a timing correction unit which corrects the modulation of the light beam controlled by the modulation controller based on at least two detection time of the light beam detected by the detection unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

[Overall Configuration of Laser Printer 1]

Figure 1:
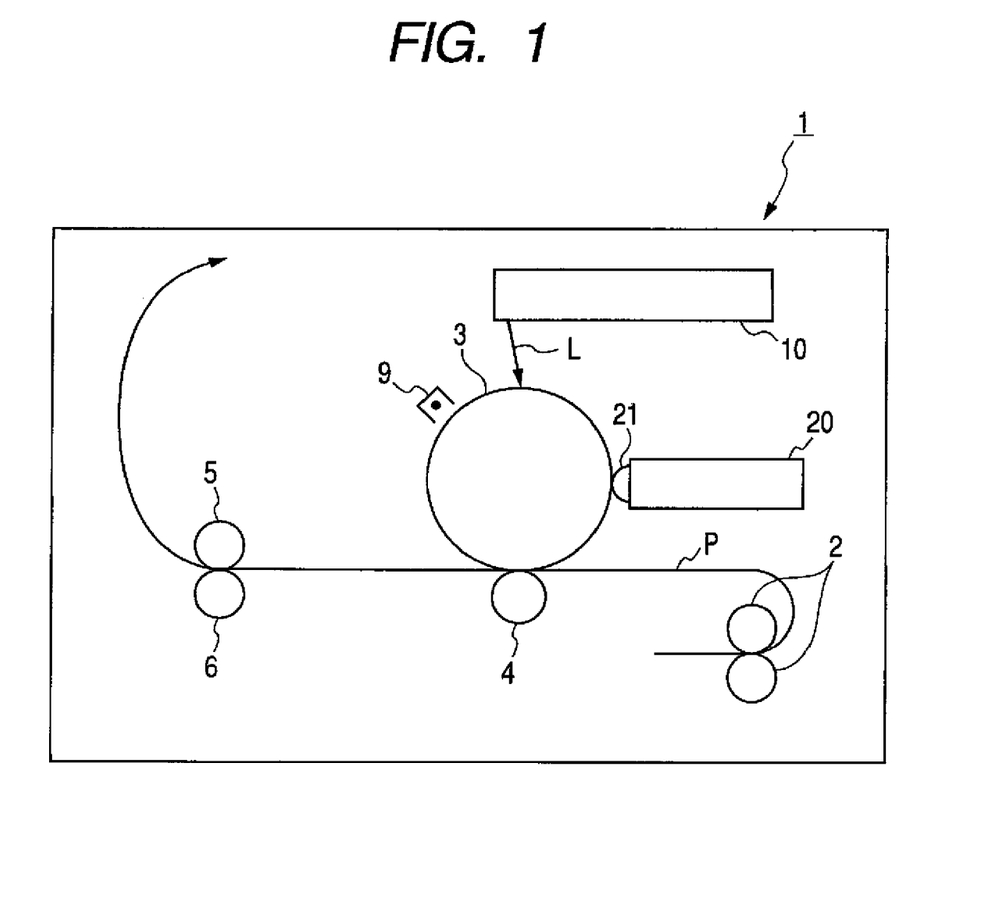
FIG. 1 is a explanatory view schematically showing the configuration of a laser printer according to an exemplary embodiment of the present invention.

An exemplary embodiment of the present invention will be described with reference to the accompanying drawings. FIG. 1 is an explanatory view schematically showing the configuration of a laser printer 1 as an example of an image forming apparatus. The laser printer 1 comprises a pair of conveying rollers 2 for conveying a sheet P as an example of a recording medium supplied one by one from a sheet feed tray (not shown) as shown in FIG. 1. The sheet P conveyed by the conveying rollers 2 is passed between a photosensitive drum 3 as an example of a photoconductor and a transfer roller 4 as an example of a transfer unit, further passed between a heating roller 5 and a pressing roller 6, and discharged onto a paper output tray (not shown) provided on an upper surface of the laser printer 1.

The photosensitive drum 3 includes a drum main body and a positively charged photosensitive layer formed on the surface of the drum main body. The positively charged photosensitive layer is made of an organic photosensitive material, for example, polycarbonate, on the surface thereof. The drum main body is grounded, and is supported on the laser printer 1 to be rotatable in a clockwise direction in FIG. 1.

Around the outer periphery of the photosensitive drum 3, a charger unit 9, a laser scanner unit 10 as an example of a light scanning device, and a developing unit 20 as an example of a developing unit are disposed, besides the transfer roller 4, from an upstream side in the rotational direction. The charger unit 9 is a scorotron type charger for positive charge and generates a corona discharge from a charging wire made of tungsten or the like. The charger unit 9 is configured to positively and uniformly charge the surface of the photosensitive drum 3. The laser scanner unit 10 scans a laser beam L over the photosensitive drum 3 with a mechanism described later. The developing unit 20 supplies a positively charged toner (not shown) via a developing roller 21 onto the surface of the photosensitive drum 3. In this exemplary embodiment, a positively chargeable, non-magnetic one component polymerized toner is employed as the toner.

In the course of forming toner image, at first, the surface of the photosensitive drum 3 is positively charged by the charger unit 9 uniformly along with the rotation of the photosensitive drum 3. The photosensitive drum 3 is exposed by fast scanning of a laser beam L from the laser scanner unit 10, and formed with an electrostatic latent image according to print data. The positively charged toner is supplied to the photosensitive drum 3 by the developing unit 20. The supplied toner is selectively deposited on the electrostatic latent image formed on the surface of the photosensitive drum 3, namely, an exposed part of the surface of the photosensitive drum 3 which is positively charged uniformly, and exposed by the laser beam L and having a lower potential. Accordingly, the electrostatic latent image is visualized and a toner image is formed.

The transfer roller 4 is supported on the laser printer 1 to be rotatable in a counterclockwise direction in FIG. 1. This transfer roller 4 includes a metallic roller shaft and a rubber material having ion conduction property covering around the metallic roller shaft. A transfer bias (forward transfer bias) is applied from a transfer bias power source (not shown) at the time of transfer. Therefore, the toner deposited on the surface of the photosensitive drum 3 is transferred onto the sheet P while the sheet P is passed between the photosensitive drum 3 and the transfer roller 4. The sheet P with the toner transferred is sandwiched between the heating roller 5 and the pressing roller 6 to thermally fix the toner on the sheet P, and discharged onto the sheet discharge tray.

[Configuration of Laser Scanner Unit 10]

Figure 2:
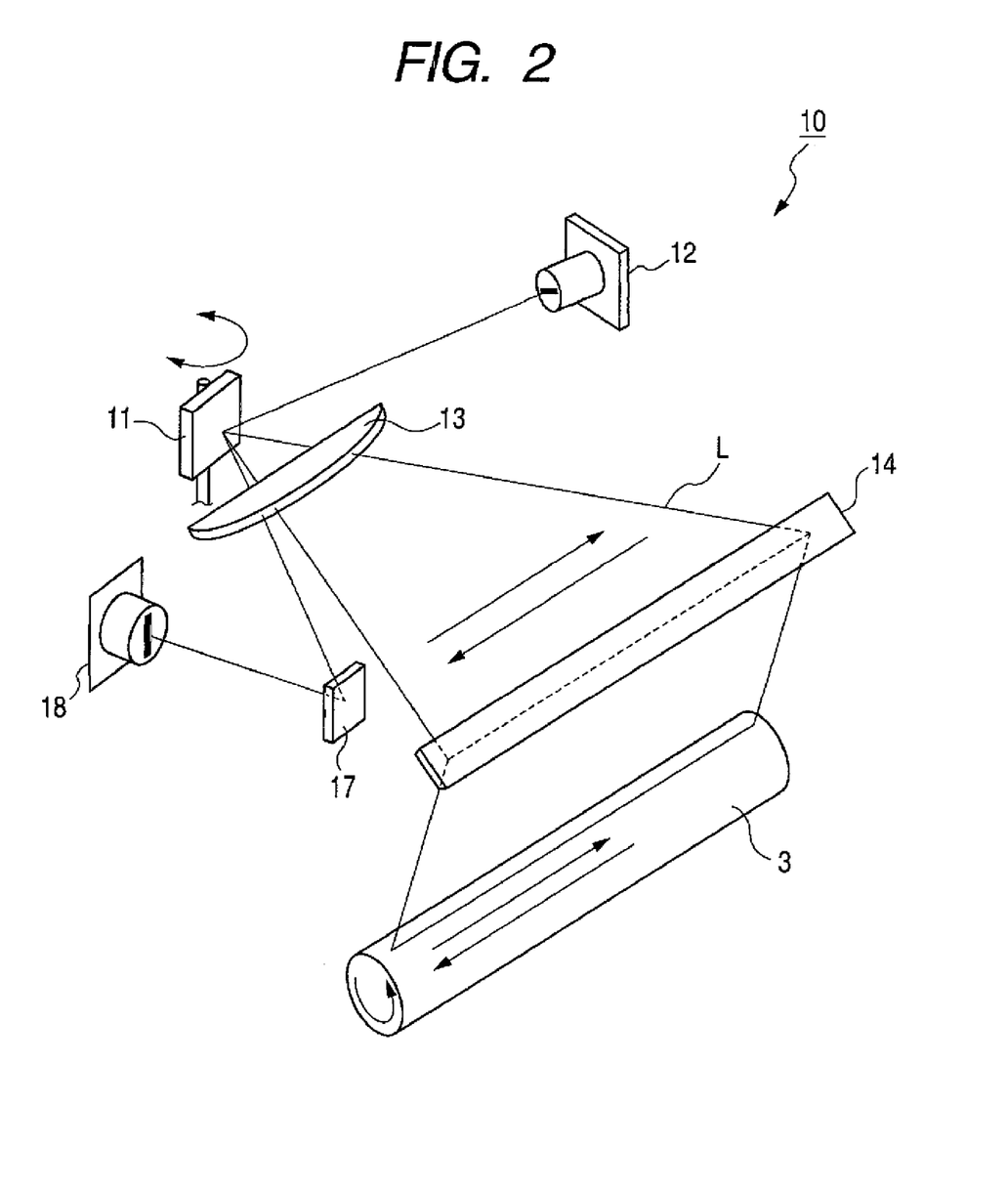
FIG. 2 is a perspective view showing the internal configuration of a laser scanner unit of the laser printer.

FIG. 2 is a perspective view showing the internal configuration of the laser scanner unit 10. The laser scanner unit 10 includes an oscillating mirror 11 which rotationally oscillates in reciprocating manner with an oscillating element (not shown), and a laser diode 12 as an example of a light source that emits a laser beam L to the oscillating mirror 11, as shown in FIG. 2.

The laser beam L reflected from the oscillating mirror 11 is scanned at a given amplitude (hereinafter referred to as a scanning amplitude). And, the laser beam L reflected from the oscillating mirror 11 passes through an F arcsine θ lens 13 as an example of a part of an optical system, and is reflected from a reflecting mirror 14 to reach the photosensitive drum 3. The F arcsine θ lens 13 is a lens having the relationship of r=f·arcsin θ (f is a focal length of the lens) between the incident angle θ and the image forming position r, and adjusted so that the laser beam L would be scanned over the photosensitive drum 3 disposed on a scanning line at an equal speed in the scanning direction (the axial direction of the photosensitive drum 3), when the scanning amplitude is the reference value. The oscillating mirror 11 oscillates in reciprocal rotation around the vertical axis, but may oscillate around two axes so that the directions of the scanning line formed on the photosensitive drum 3 may be parallel in the both ways in the reciprocation.

Also, a BD mirror 17 for reflecting the laser beam L is disposed in an area which is inside the scanning amplitude and outside a range (hereinafter referred to as a print width) where the laser beams L is reflected from the reflecting mirror 14 toward the photosensitive drum 3. Further, the laser scanner unit 10 has a BD sensor 18 as an example of a detection unit which detects the laser beam L reflected from the BD mirror 17. Therefore, the modulation timing of the laser diode 12 can be adjusted, based on the timing at which the BD sensor 18 detects the laser beam L.

[Configuration and Control of a Control System in the Laser Printer 1]

Figure 3:
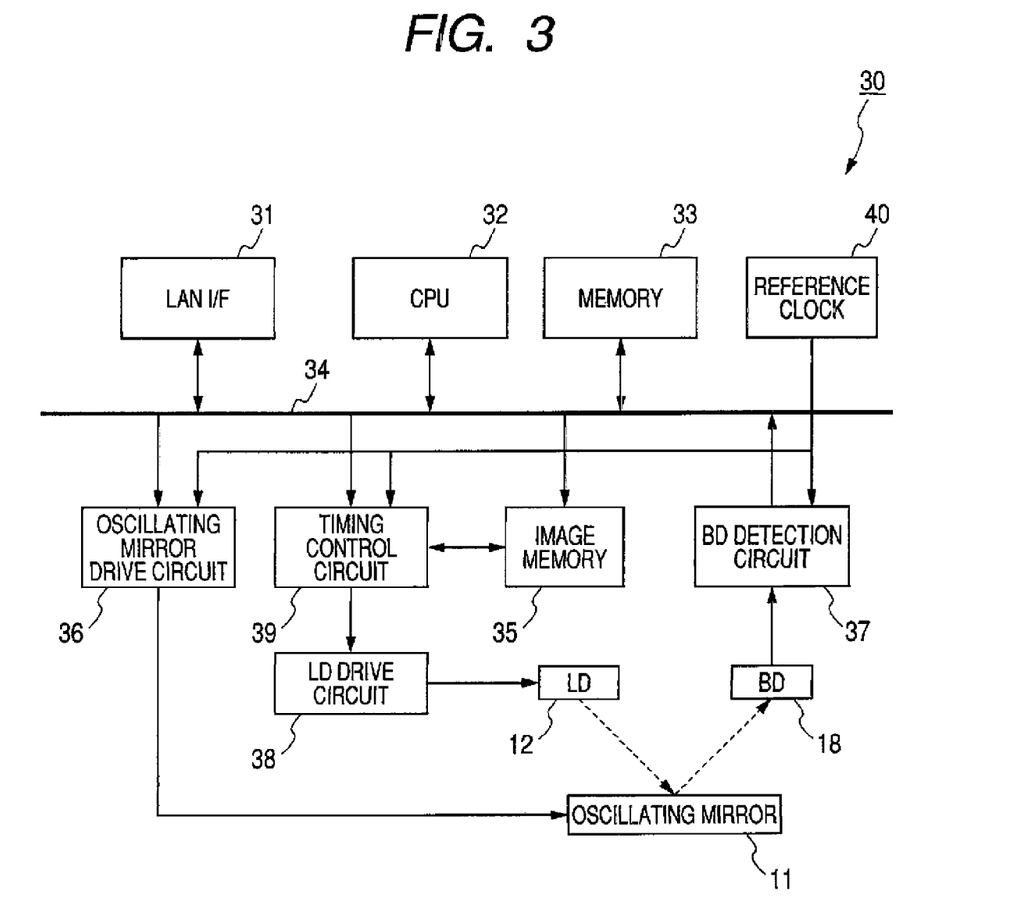
FIG. 3 is a block diagram showing the configuration of a control system of the laser printer.

FIG. 3 is a block diagram showing the configuration of a controller 30 in the laser printer 1 in respect of a section relevant to the laser scanner unit 10. The controller 30 is configured as a microcomputer including a LAN interface (LAN I/F) 31 for connecting to a LAN (not shown), a CPU 32 for performing various kinds of operations, and a memory 33 which are connected via a bus 34, as shown in FIG. 3. Further, an image memory 35 in which print data inputted via the LAN interface 31 is expanded as the two-dimensional image, an oscillating mirror drive circuit 36 for driving the oscillating mirror 11, a BD detection circuit 37 for reading and comparing an output signal of the BD sensor (BD) 18 with a predetermined threshold value, and a timing control circuit 39 as an example of a modulation controller which instructs an emission timing of the laser diode 12 to an LD drive circuit 38 for driving the laser diode (LD) 12 are connected to the bus 34. Also, a common reference clock 40 is inputted into the oscillating mirror drive circuit 36, the BD detection circuit 37 and the timing control circuit 39. The oscillating mirror drive circuit 36, the BD detection circuit 37 and the timing control circuit 39 perform driving of the oscillating mirror 11, the sampling of the output signal of the BD sensor 18, and the control of the emission timing based on this clock.

Figure 4:
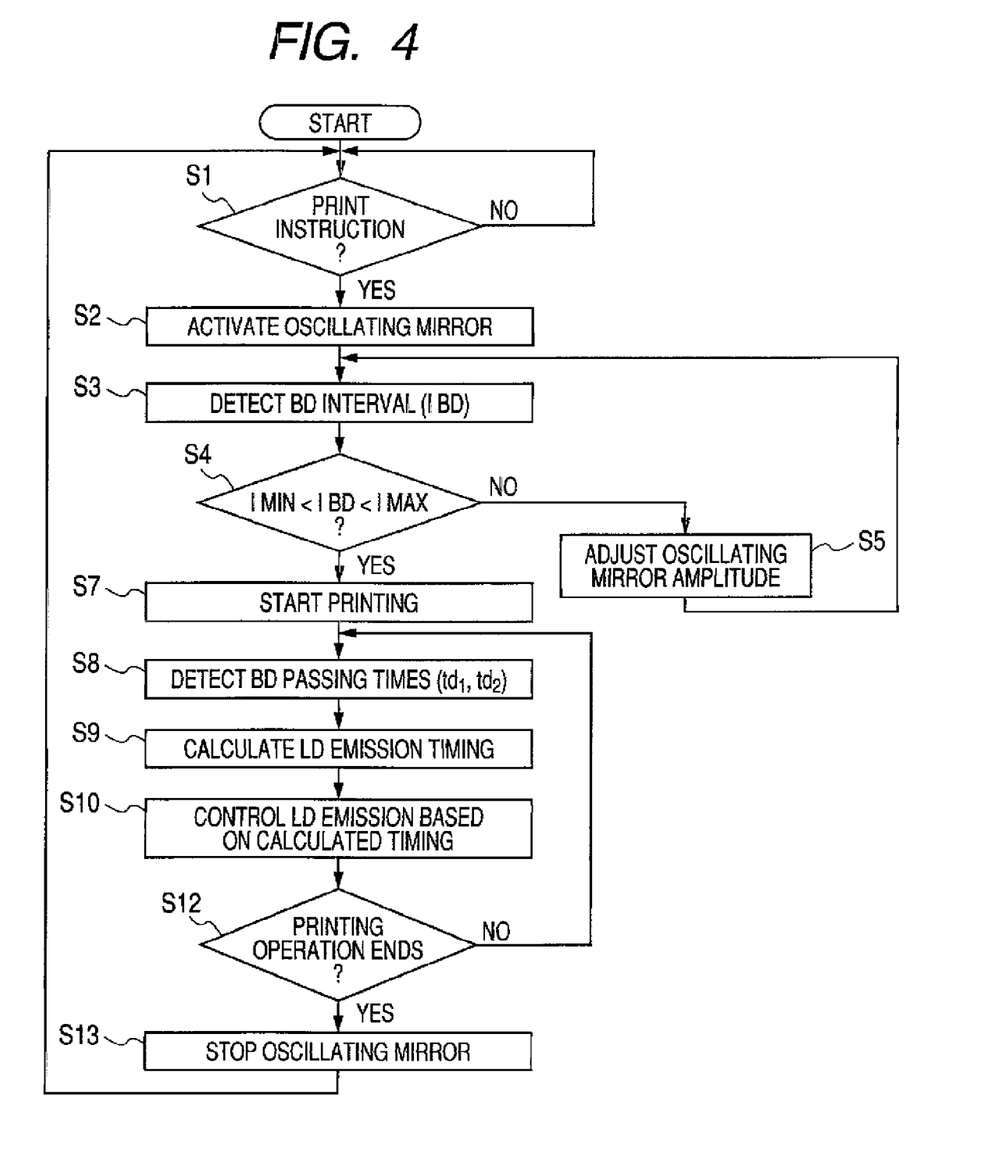
FIG. 4 is a flowchart showing a process performed by the control system.

Referring to a flowchart of FIG. 4, a process performed by this controller 30 will be described below. In this process, first of all, it is determined whether or not a print instruction is inputted via the LAN interface 31 at an operation S1 as shown in FIG. 4. If the print instruction is not inputted (S1: No), the process waits at operation S1. Whereas, if the print instruction is inputted (S1: Yes), the process proceeds to operation S2. At operation S2, the oscillating mirror 11 is activated via the oscillating mirror drive circuit 36, and at the following operation S3, a BD interval (I BD) is detected as follows.

Figure 5:
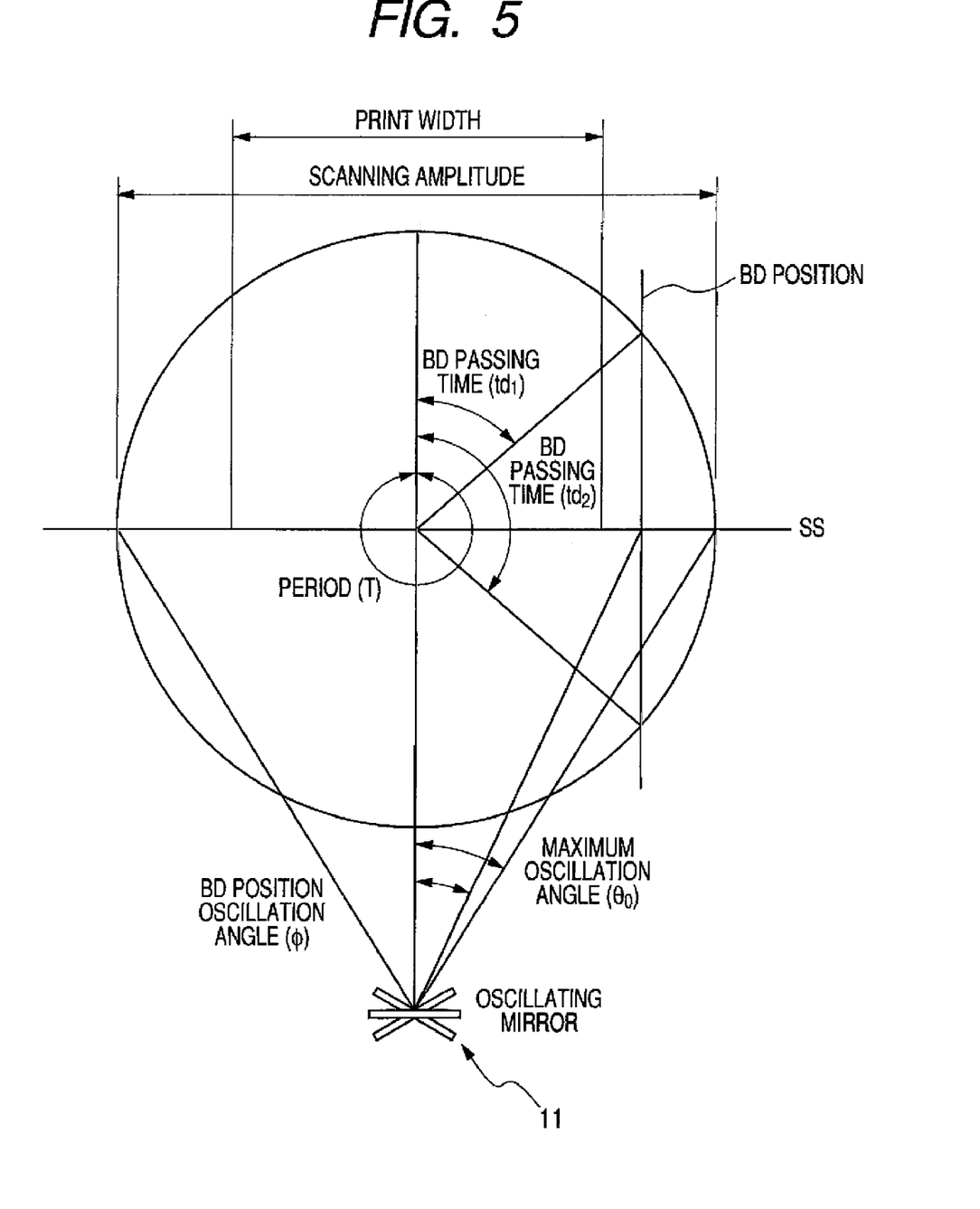
FIG. 5 is an explanatory view schematically showing a concept of the process.

Specifically, assuming that the F arcsine θ lens 13 is not provided, the laser beam L is scanned in a sinusoidal wave on the scanning line by the oscillating mirror 11. Therefore, the movement of the scanning position can be considered as an orthogonal projection of circular movement on the scanning line SS, as shown in FIG. 5. Also, since the BD mirror 17 is disposed in the area which is inside the scanning amplitude and outside the print width as previously described, the scanning light passes a detecting position of the BD sensor 18 (hereinafter referred to as a BD position) twice within one period T. In the one period T, the two consecutive passing times of the BD position are hereinafter referred to as BD passing time and denoted as $td_1$ and $td_2$ where $td_1 < td_2$ and $td_2 - td_1 < T/2$. At operation S3, a difference $(td_2 - td_1)$ between the consecutive two passing times is detected as a BD interval which is hereinafter denoted as I BD. At the following operation S4, it is determined whether or not the I BD is larger than a minimum value I MIN which is a minimum value of the printable BD interval, and smaller than the maximum value I MAX which is a maximum value of the printable BD interval. If I BD≦I MIN or I MAX≦I BD is satisfied (S4: No), the process proceeds to operation S5, where the amplitude of the oscillating mirror 11 is adjusted by changing the application voltage applied by the oscillating mirror drive circuit 36, and the process returns to operation S3. Thus, if I MIN<I BD<I MAX is satisfied (S4: Yes) while the operations S3 to S5 is repeated, the process proceeds to operation S7. At operation S7, the printing operation is started by driving various rollers, and at the following operation S8, the BD passing times $td_1$ and $td_2$ are detected. And at the following operation S9, the emission timing of the laser diode 12 is calculated in the following manner.

That is, supposing that φ(t) denotes the displacement angle of the laser beam L, T denotes the vibration period of the oscillating mirror 11, θc denotes the maximum oscillation angle, Dc denotes the delay time of oscillation of the oscillating mirror 11, and t denotes time, φ(t) is generally represented in the following expression (1).

[Expression 1]

$$\phi(t) = \theta_c \sin\left[\frac{2\pi}{T}(t - D_c)\right] \quad (1)$$

Supposing that φ denotes the oscillation angle corresponding to the BD position, since the BD passing times are $td_1$ and $td_2$, the following simultaneous equations can be obtained (expression 2). And, by solving the equations, the solutions (2) can be obtained.

[Expression 2]

$$\phi = \theta_c \sin\left(\frac{2\pi}{T}(td_1 - D_c)\right)$$

$$\phi = \theta_c \sin\left(\frac{2\pi}{T}(td_2 - D_c)\right)$$

[Expression 3]

$$D_c = \frac{1}{2}(td_1 + td_2) - \frac{T}{4} \quad (2)$$

$$\theta_c = \frac{\phi}{\cos\left[\frac{\pi}{T}(td_1 - td_2)\right]}$$

Then, substituting the solutions (2) in the expression (1), φ(t) can be represented in the following expression (3).

[Expression 4]

$$\phi(t) = \phi \frac{\cos\left[\frac{\pi}{T}(2t - td_1 - td_2)\right]}{\cos\left[\frac{\pi}{T}(td_1 - td_2)\right]} \quad (3)$$

Next, the F arcsine θ lens 13 is adjusted so that the laser beam L would be scanned at an equal speed in the scanning direction (axial direction of the drum) of the photosensitive drum 3 disposed on the scanning line, when the scanning amplitude is reference value, namely, when the maximum oscillation angle θc is the reference value θ0. In this way, if the BD passing times $td_1$ and $td_2$ are $td_{01}$ and $td_{02}$ ($td_{01} < td_{02}$) when the scanning amplitude is the reference value, the following expression (4) is satisfied, in which φ0(t) denotes the oscillation angle when the scanning amplitude is the reference value.

[Expression 5]

$$\phi_0(t) = \phi \frac{\cos\left[\frac{\pi}{T}(2t - td_{01} - td_{02})\right]}{\cos\left[\frac{\pi}{T}(td_{01} - td_{02})\right]} \quad (4)$$

However, the actual scanning amplitude would not coincide with the reference value in many cases, in which the BD passing times are also different from $td_{01}$ and $td_{02}$. Therefore, the laser beam can not be scanned on the scanning line at the equal speed. Thus, in this exemplary embodiment, tc satisfying φ(tc)=φ0(t) is obtained by the following manner.

$$\phi\frac{\cos\left[\frac{\pi}{T}(2t_c - td_1 - td_2)\right]}{\cos\left[\frac{\pi}{T}(td_1 - td_2)\right]} = \phi\frac{\cos\left[\frac{\pi}{T}(2t - td_{01} - td_{02})\right]}{\cos\left[\frac{\pi}{T}(td_{01} - td_{02})\right]} \quad \text{[Expression 6]}$$

That is, the above equation is set and this equation is solved for tc to obtain the following solution.

[Expression 7]

If $2t < td_{01} + td_{02}$ $$t_c = \frac{T}{2\pi}ar\cos$$

$$\left\{\cos\left[\frac{\pi}{T}(2t - td_{01} - td_{02})\right]\frac{\cos\left[\frac{\pi}{T}(td_1 - td_2)\right]}{\cos\left[\frac{\pi}{T}(td_{01} - td_{02})\right]}\right\} + \frac{td_1 + td_2}{2}$$

If $2t \geq td_{01} + td_{02}$ $$t_c = \frac{T}{2\pi}ar\cos$$

$$\left\{\cos\left[\frac{\pi}{T}(2t - td_{01} - td_{02})\right]\frac{\cos\left[\frac{\pi}{T}(td_1 - td_2)\right]}{\cos\left[\frac{\pi}{T}(td_{01} - td_{02})\right]}\right\} + \frac{td_1 + td_2}{2}$$

By converting time t into tc in accordance with the above expressions and controlling the laser diode 12 to emit the light at a timing corresponding to the time tc after conversion, the scanning can be performed as if the F arcsine θ lens 13 were adjusted in accordance with the scanning amplitude at that time. More specifically, for example, if the laser diode 12 is controlled to emit the light at the timing at which the time t at equal intervals is converted into tc in accordance with the above expressions, the electrostatic latent image can be formed on the photosensitive drum 3 at equal intervals. At operation S9, such a conversion expression for tc is calculated.

This conversion expression may be calculated by creating a table for the values $td_1$ and $td_2$, and reading the corresponding table values at operation S9. According to this configuration, the arithmetic operation can be faster.

A specific form of this table is given in the following, for example. Even if the BD passing times $td_1$ and $td_2$ are measured on the basis of a driving clock which is set to rise once for one oscillation period T by dividing the frequency of a reference clock 40, the number of combinations of $td_1$ and $td_2$ is enormous. Thus, for two parameters of $(td_1 - td_2)$ and $(td_1 + td_2)$, the above expression (7) is arranged as follows.

[Expression 8]

$$t_c = f(td_1 - td_2) + \frac{td_1 + td_2}{2}$$

Hence, only the term $f(td_1 - td_2)$ is acquired from the table, and the term $(td_1 + td_2)/2$ is calculated at necessary timing, whereby the table can be reduced in size. The term $f(td_1 - td_2)$ is given as a sequence of numbers in which each value is set corresponding to each dot formed on the photosensitive drum 3.

Additionally, it is not necessary to obtain this sequence of numbers over the oscillation period T. That is, if the sequence of numbers A for a quarter period is obtained, the next quarter period is expressed as T/2−A, the next quarter period is expressed as T/2+A, and the next quarter period is expressed as T−A. Further, it is not required that the above table has data in dots, but the table has data of every several dots, and the intermediary dots are complemented by linear approximation, whereby the table can be reduced in size.

For example, in the case where an image is formed on the photosensitive drum 3 in 4960 dots for one-way (9920 dots per two-way or oscillation period T), if data is acquired from the table at every 16 dots, the table as exemplified in the following Table 1 may be employed.

TABLE 1

| td1-td2 | 0 | 16 | 32 | 48 | 64 | ... | 2416 | 2432 | 2448 | 2464 | 2480 |
|---|---|---|---|---|---|---|---|---|---|---|---|
| t1 | $A_0$ | $A_{16}$ | $A_{32}$ | $A_{48}$ | $A_{64}$ | ... | $A_{2416}$ | $A_{2432}$ | $A_{2448}$ | $A_{2464}$ | $A_{2480}$ |
| t2 | $B_0$ | $B_{16}$ | $B_{32}$ | $B_{48}$ | $B_{64}$ | ... | $B_{2416}$ | $B_{2432}$ | $B_{2448}$ | $B_{2464}$ | $B_{2480}$ |
| t3 | $C_0$ | $C_{16}$ | $C_{32}$ | $C_{48}$ | $C_{64}$ | ... | $C_{2416}$ | $C_{2432}$ | $C_{2448}$ | $C_{2464}$ | $C_{2480}$ |
| t4 | $D_0$ | $D_{16}$ | $D_{32}$ | $D_{48}$ | $D_{64}$ | ... | $D_{2416}$ | $D_{2432}$ | $D_{2448}$ | $D_{2464}$ | $D_{2480}$ |
| t5 | $E_0$ | $E_{16}$ | $E_{32}$ | $E_{48}$ | $E_{64}$ | ... | $E_{2416}$ | $E_{2432}$ | $E_{2448}$ | $E_{2464}$ | $E_{2480}$ |
| t6 | $F_0$ | $F_{16}$ | $F_{32}$ | $F_{48}$ | $F_{64}$ | ... | $F_{2416}$ | $F_{2432}$ | $F_{2448}$ | $F_{2464}$ | $F_{2480}$ |
| t7 | $G_0$ | $G_{16}$ | $G_{32}$ | $G_{48}$ | $G_{64}$ | ... | $G_{2416}$ | $G_{2432}$ | $G_{2448}$ | $G_{2464}$ | $G_{2480}$ |

That is, in the Table 1, the values of $f(td_1 - td_2)$ from 0 to 2480 dots for a quarter period are set at an interval of 16 dots, as previously described, whereby the time tc for forming the dots can be calculated by adding the $(td_1 + td_2)/2$ to the value for the desired dot obtained from this table (see the next operation S10).

At the following operation S10, the conversion expression or table value for the tc calculated at operation S9 is inputted into the timing control circuit 39, and if the timing control circuit 39 is instructed to read the image memory 35, the laser diode 12 emits the light at the timing according to the print data expanded over the image memory 35 and the tc. At the following operation S12, it is determined whether or not the printing operation ends. If the printing operation does not end (S12: No), the process proceeds to operation S8 as previously described. Then, the emission timing of the laser diode 12 is corrected at any time through the operations from S8 to S10. Therefore, the positions of pixels formed on the photosensitive drum 3 are accurately arranged, whereby the excellent image without distortion can be formed on the sheet P. And if the printing operation ends (S12: Yes), the oscillating mirror 11 is stopped at operation S13, and the process returns to S1 as previously described, and waits for the next print instruction.

Effects of The Exemplary Embodiment

In this exemplary embodiment, since the emission timing of the laser diode 12 is corrected using the conversion expression of the tc, it is possible to form the excellent image without distortion on the sheet P by arranging accurately the positions of pixels.

Figure 6:
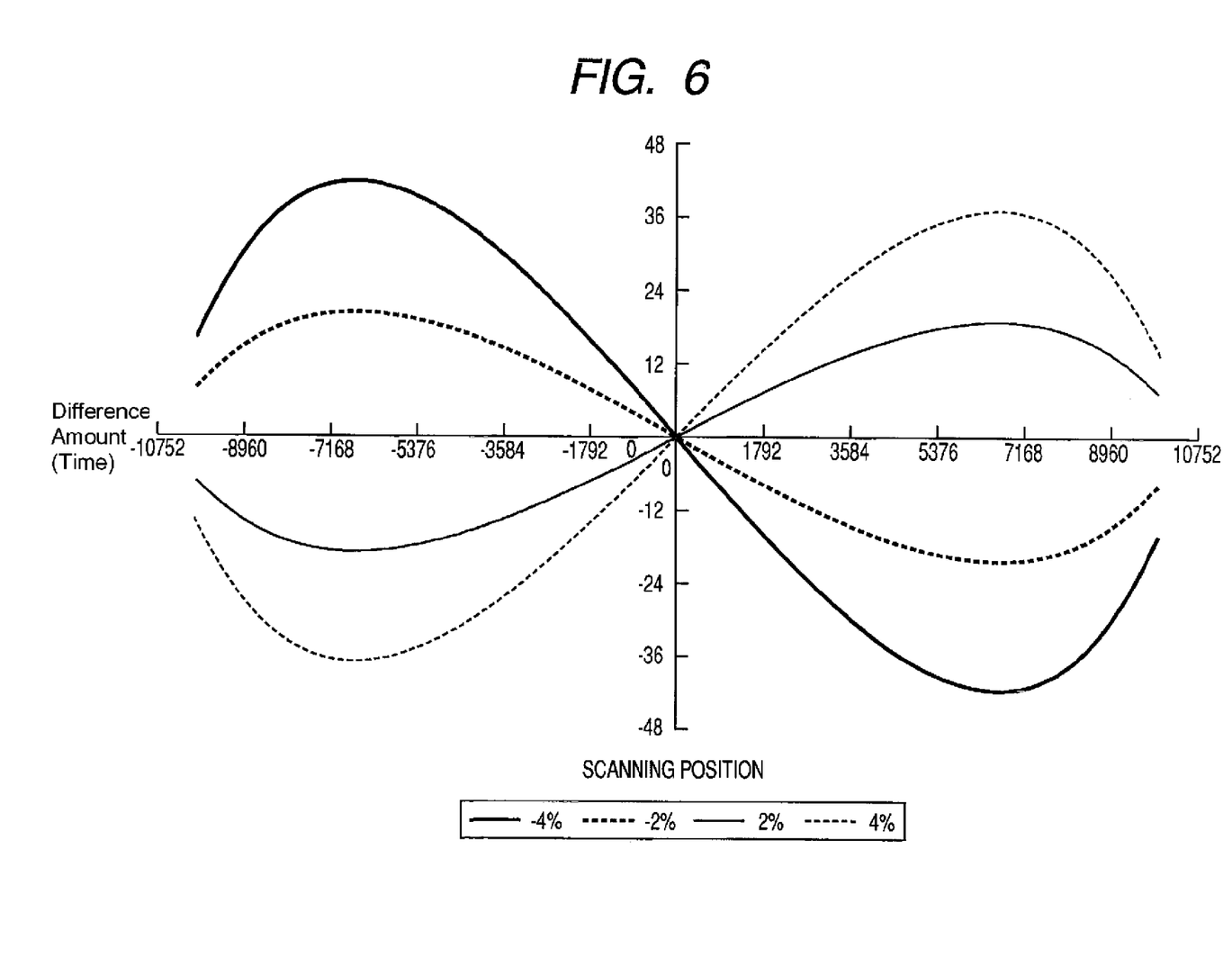
FIG. 6 is a view showing simulation results for illustrating effects of the process.

FIG. 6 is an explanatory view showing a time difference between the case where the laser diode 12 is controlled to emit the light at the time t at equal intervals after determining the write start position and write end position by the same method as described in the JP-A-2003-131151 and the case where the laser diode 12 is controlled to emit the light at the timing at which the time t is converted into tc. FIG. 6 is a graph plotting the time difference amount at a period of 80000 when the deviation of value $td_1-td_2$ from the reference value is −4%, −2%, 2% and 4%. The design values used for this simulation are listed in a table below.

TABLE 2

| Item | | Design value | Unit |
|---|---|---|---|
| Period | T | 80000 | — |
| Maximum oscillation angle | $\theta_0$ | 40 | Degree |
| Oscillation angle at BD position | $\phi$ | 32 | Degree |
| BD transit time | $td_{01}$ | 10696.11 | — |
| | $td_{02}$ | 29303.89 | — |

If the laser diode 12 is controlled to emit the light at the timing at which the time t is converted into tc, there occurs no time difference as will be apparent from the above consideration, but when the laser diode is controlled to emit the light at the time t at equal intervals, there occurs a large difference as the deviation of the value $td_1-td_2$ from the reference value increases to ±2% and ±4%, as shown in FIG. 6. This difference amount is about "4", and appears as a deviation equivalent to one dot at a print density of 600 dpi. Accordingly, it can be found from FIG. 6 that when the value of $td_1-td_2$ is −4%, a distortion as large as 10 dots at maximum occurs. From the results of this simulation, it can be found that the distortion of image can be suppressed excellently in the exemplary embodiment.

Additionally, in the exemplary embodiment, the common reference clock 40 is inputted into the oscillating mirror drive circuit 36, the BD detection circuit 37 and the timing control circuit 39, whereby the drive timing of the oscillating mirror 11, the sampling timing of the output signal of the BD sensor 18 and the emission timing of the laser diode 12 are synchronized. Accordingly, a more accurate image can be formed by suppressing a difference in the modulation timing due to accumulated errors. Further, in the exemplary embodiment, the correction is made (see operation S12) by repeatedly detecting $td_1$ and $td_2$ during printing operation, as previously described, whereby a more accurate image can be further formed by coping with the variations in the scanning amplitude during printing operation.

Also, since the emission timing of the laser diode 12 is controlled in accordance with the scanning amplitude, the control can be performed more stably without being affected by a transient phenomenon of the behavior of the oscillating mirror 11 than the scanning amplitude is directly controlled via the oscillating mirror drive circuit 36. And it is not required that the drive waveforms (voltage, bias, duty) of the oscillating mirror 11 are adjusted minutely, whereby the controller 30 can be constructed cheaply. Also, the laser printer 1 of this exemplary embodiment can be easily reduced in size by using the oscillating mirror 11 as compared with the case of using the polygon mirror.

While the present invention has been shown and described with reference to certain exemplary embodiments thereof, it will be understood by those skilled in the art that various changes in form and details may be made therein without departing from the spirit and scope of the invention as defined by the appended claims.

For example, though the timing control circuit 39 controls the LD drive circuit 38 to make the modulation in this exemplary embodiment, the modulation may be made by a shutter provided in front of the laser diode by causing the laser diode to emit the light. Also, though the monochrome laser printer 1 is exemplified in the above exemplary embodiment, the inventive concept of the present invention may be applied to a color printer, whereby the effect of arranging the positions of pixels as previously described appears more remarkably.

Further, the inventive concept of the present invention may be also applied to the laser scanner unit in which a pair of the BD mirrors 17 and a pair of the BD sensors 18 are provided on either side of the print width. In this case, the same timing correction as above may be made based on the timing at which a pair of the BD sensors 18 detect the laser beam L successively, in which it is required that the computation expression is appropriately changed. The change of this computation expression is well known, and the explanation is omitted here. Further, in the exemplary embodiment, two consecutive passing times of the BD position are used for adjusting the modulating timing of the laser diode 12. However, it may be not always necessary to use two consecutive passing times. Two non-consecutive passing times or three or more passing times may be used for adjusting the modulating timing of the laser diode 12.

Furthermore, the light scanning device of the invention may be applied not only to the image forming apparatus but also to various kinds of light scanning device such as a bar code reader or a display device.

The present invention provides illustrative, non-limiting embodiments as follows:

A light scanning device comprises: a light source which emits a light beam; an oscillating mirror which oscillates rotationally to reflect the light beam; an optical system which is disposed between the oscillating mirror and a target, and which is configured to convert the light beam reflected by the oscillating mirror to be scanned over a scanning line on the target at a constant speed when an oscillation amplitude of the light beam by the oscillating mirror is a reference value; a detection unit which detects the light beam at least one position within a scanning range of the light beam; a modulation controller which controls modulation of the light beam based on external data; and a timing correction unit which corrects a modulation timing by the modulation controller based on two consecutive detection times of the light beam detected by the detection unit and two consecutive detection times of the light beam detected by the detection unit when the oscillation amplitude of the light beam by the oscillating mirror is the reference value.

According to the above configuration, the oscillating mirror reflects the light beam emitted from the light source while oscillating rotationally in a reciprocating manner. Also, the optical system, which is disposed between the oscillating mirror and the target, is adjusted so that the light beam reflected by the oscillating mirror may be scanned over the scanning line at a constant speed when the amplitude of the light beam by the oscillating mirror is the reference value. Therefore, the light emission time of the light beam corresponding to each pixel set at a fixed width on the scanning line is the fixed time. Further, the detection unit detects the light beam at least one position within the scanning range of the light beam, and the modulation controller controls the modulation of the light beam based on external data.

And the timing correction unit corrects the modulation timing by the modulation controller, based on two consecutive detection times of the light beam detected by the detection unit and the detection time where the amplitude is the reference value. According to this configuration, since the modulation timing is corrected based on two light beam detection times actually detected and the detection time where the amplitude of the light beam is the reference value, the positions of pixels on the scanning line can be accurately arranged even when the optical system is disposed between the oscillating mirror and the scanning line on the target.

Though the invention is not limited to the following configuration, the timing correction unit may correct the modulation timing by the modulation controller so that the positions of the projection pixels of the light beam projected via the optical system may be arranged at the formation positions on the scanning line. In other words, the timing correction unit may correct the modulation timing by the modulation controller so that, even when the oscillation amplitude of the light beam by the oscillating mirror is not the reference value, a projected point of the light being is arranged at a same position as a projected point of the light beam when the oscillation amplitude of the light beam by the oscillating mirror is the reference value.

Also, the timing correction unit corrects the modulation timing by using a table in which the two consecutive detection times of the light beam detected by the detection unit are associated with a modulation timing correction amount of the light beam. In this case, the arithmetic operation of the timing correction unit can be made faster by using the table.

Further, a clock used for the modulation controller to control the modulation timing and a clock used for driving the oscillating mirror are synchronized. In this case, since the clock used for controlling the modulation timing and the clock used for driving the oscillating mirror are synchronized, it is possible to suppress a deviation in the modulation timing due to accumulated errors.

Further, a clock used for the modulation controller to control the modulation timing, a clock used for driving the oscillating mirror, and a clock used for determining a sampling timing of the light beam by the detection unit are synchronized. In this case, since the clock used for controlling the modulation timing, the clock used for driving the oscillating mirror, and the used clock for sampling are synchronized, it is possible to suppress more excellently a deviation in the modulation timing due to accumulated errors.

Also, an image forming apparatus comprises the light scanning device as described above, a photoconductor which is disposed on the scanning line of the light scanning device as the target, and on which an electrostatic latent image is formed by applying the light beam; a developing unit which develops the electrostatic latent image formed on the photoconductor by depositing a developer; and a transfer unit which transfers the developer deposited by the developing unit onto a recording medium, wherein the external data includes print data.

According to the above configuration, the positions of pixels corresponding to the print data can be arranged accurately to apply the light beam to the photoconductor disposed on the scanning line by inputting the print data as the external data into the light scanning device as described above. Then, an electrostatic latent image is formed on the photoconductor by applying the light beam, the electrostatic latent image is developed when the developing unit deposits the developer, and the deposited developer is transferred to the recording medium by the transfer unit, whereby an image is formed on the recording medium. Accordingly, the positions of pixels are arranged and the image formed on the recording medium in this manner is the excellent image without distortion. And the light scanning device can be reduced in size by using the oscillating mirror. Therefore, the image forming apparatus of the invention can be easily reduced in size and form the excellent image without distortion.

What is claimed is:

1. A light scanning device comprising:
   a light source which emits a light beam;
   an oscillating mirror which oscillates rotationally to reflect the light beam;
   an optical system which is disposed between the oscillating mirror and a target, and which is configured to convert the light beam reflected by the oscillating mirror to be scanned over a scanning line on the target at a constant speed when an oscillation amplitude of the light beam by the oscillating mirror is a reference value;
   a detection unit which detects the light beam at least one position within a scanning range of the light beam;
   a modulation controller which controls modulation of the light beam based on external data; and
   a timing correction unit which corrects a modulation timing by the modulation controller based on two consecutive detection times of the light beam detected by the detection unit and two consecutive detection times of the light beam detected by the detection unit when the oscillation amplitude of the light beam by the oscillating mirror is the reference value.

2. The light scanning device according to claim 1, wherein the timing correction unit corrects the modulation timing by the modulation controller so that, event when the oscillation amplitude of the light beam by the oscillating mirror is not the reference value, a projected point of the light beam is arranged at a same position as a projected point of the light beam when the oscillation amplitude of the light beam by the oscillating mirror is the reference value.

3. The light scanning device according to claim 1, wherein the timing correction unit corrects the modulation timing by using a table in which the two consecutive detection times of the light beam detected by the detection unit are associated with a modulation timing correction amount of the light beam.

4. The light scanning device according to claim 1, wherein a clock used for the modulation controller to control the modulation timing and a clock used for driving the oscillating mirror are synchronized.

5. The light scanning device according to claim 1, wherein a clock used for the modulation controller to control the modulation timing, a clock used for driving the oscillating mirror, and a clock used for determining a sampling timing of the light beam by the detection unit are synchronized.

6. The light scanning device according to claim 1, further comprising a clock which counts time,
   wherein the timing correction unit converts the time counted by the clock into a corrected time based on the two consecutive detection times of the light beam detected by the detection unit.

7. The light scanning device according to claim 1,
   wherein the timing correction unit corrects the modulation timing with using a corrected time obtained from the following expression:

$$t_c = f(td_1 - td_2) + \frac{td_1 + td_2}{2}$$

where:

tc denotes the corrected time;

$td_1$ and $td_2$ denote the two consecutive detection times of the light beam detected by the detection unit, wherein $td_1 < td_2$ and $td_2 - td_1 < T/2$ and T is one time period of the oscillation of the oscillating mirror; and f is a function of $td_1 - td_2$.

8. The light scanning device according to claim 7, wherein the term $f(td_1 - td_2)$ is obtained from a table.

9. The light scanning device according to claim 8, wherein the table shows a relationship between a value of $(td_1 - td_2)$, a position in the scanning line and the corrected time.

10. An image forming apparatus comprising:
a light scanning device comprising:
- a light source which emits a light beam;
- an oscillating mirror which oscillates rotationally to reflect the light beam;
- an optical system which is disposed between the oscillating mirror and a target, and which is configured to convert the light beam reflected by the oscillating mirror to be scanned over a scanning line on the target at a constant speed when an oscillation amplitude of the light beam by the oscillating mirror is a reference value;
- a detection unit which detects the light beam at at least one position within a scanning range of the light beam;
- a modulation controller which controls modulation of the light beam based on print data; and
- a timing correction unit which corrects a modulation timing by the modulation controller based on two consecutive detection times of the light beam detected by the detection unit and two consecutive detection times of the light beam detected by the detection unit when the oscillation amplitude of the light beam by the oscillating mirror is the reference value;

a photoconductor which is disposed on the scanning line of the light scanning device as the target, and on which an electrostatic latent image is formed by applying the light beam;

a developing unit which develops the electrostatic latent image formed on the photoconductor by depositing a developer; and a transfer unit which transfers the developer deposited by the developing unit onto a recording medium.

11. A light scanning device comprising:
- a light source which emits a light beam;
- a modulation controller which controls modulation of the light beam emitted from the light source according to external data;
- an oscillating mirror which oscillates rotationally to reflect the light beam;
- an optical system which is configured to convert the light beam reflected by the oscillating mirror to be scanned;
- a detection unit which detects the light beam passing through a detection position; and
- a timing correction unit which corrects the modulation of the light beam controlled by the modulation controller based on at least two detection time of the light beam detected by the detection unit.

12. The light scanning device according to claim 11, further comprising a storage unit which stores data based on reference detection times,
wherein the timing correction unit corrects the modulation of the light beam based on the at least two detection time of the light beam detected by the detection unit and the data based on the reference detection times stored in the storage unit.

13. The light scanning device according to claim 12,
wherein the reference detection times include detection times of the light beam detected by the detection unit when the oscillating mirror oscillates by a reference oscillation amplitude.

14. The light scanning device according to claim 11, further comprising a clock which counts time,
wherein the timing correction unit converts the time counted by the clock into corrected time based on the at least two detection time of the light beam detected by the detection unit, and
wherein the modulation controller controls the modulation of the light beam according to the external data with reference to the corrected time.

15. The light scanning device according to claim 11,
wherein the optical system is configured to convert the light beam reflected by the oscillating mirror to be scanned over a scanning line at a constant speed when the oscillating mirror oscillates by a reference oscillation amplitude.

16. The light scanning device according to claim 15,
wherein the optical system includes an F arcsine θ lens.

\* \* \* \* \*